United States Patent [19]

Akashi et al.

[11] Patent Number: 4,566,905

[45] Date of Patent: Jan. 28, 1986

[54] HIGH DENSITY BORON NITRIDE-CONTAINING SINTERED BODY FOR CUTTING TOOL AND A METHOD OF PRODUCING THE SAME

[75] Inventors: Tamotsu Akashi, Chita; Masatada Araki, Handa, both of Japan

[73] Assignee: Nippon Oil and Fats Co., Ltd., Japan

[21] Appl. No.: 533,943

[22] Filed: Sep. 20, 1983

[30] Foreign Application Priority Data

Oct. 1, 1982 [JP] Japan ................. 57-172696

[51] Int. Cl.[4] .................................... B22F 3/14
[52] U.S. Cl. ......................... 75/244; 75/238; 75/233
[58] Field of Search ............... 75/244, 233, 238; 501/96

[56] References Cited

U.S. PATENT DOCUMENTS 4,334,928  6/1982  Hara et al. ............... 75/244
4,343,651  8/1982  Yazu et al. .............. 75/238
4,394,170  7/1983  Sawaoka et al. .......... 75/244

OTHER PUBLICATIONS

Hausner, *Handbook of Powder Metallurgy*, Chemical Pub. Co., N.Y. (1973), p. 14.

*Primary Examiner*—John F. Terapane
*Assistant Examiner*—Anne Brookes
*Attorney, Agent, or Firm*—Parkhurst & Oliff

[57] ABSTRACT

A high density boron nitride-containing sintered body consisting of 60–95% by volume of high density boron nitride and 40–5% by volume of metal alone or in admixture with a ceramic, which high density boron nitride consists of 60–95% by volume of cubic system boron nitride and 40–5% by volume of wurtzite-structured boron nitride, and which cubic system boron nitride has an average particle size of at least 5 times that of the wurtzite-structured boron nitride. The sintered body has a high cutting performance and is suitable as a cutting tool for chilled roll, ultra-heat resisting alloy, cast iron and the like.

2 Claims, 2 Drawing Figures

HIGH DENSITY BORON NITRIDE-CONTAINING SINTERED BODY FOR CUTTING TOOL AND A METHOD OF PRODUCING THE SAME

BACKGROUND OF THE INVENTION (1) Field of the Invention

The present invention relates to a sintered body containing both cubic system boron nitride (hereinafter, referred to as CBN) and wurtzite-structured boron nitride (hereinafter, referred to as WBN) which can be used for cutting steel having a high hardness, and a method of producing the sintered body.

(2) Description of the Prior Art

CBN is commercially synthesized by a method, wherein low density boron nitride (hereinafter, referred to as gBN) is once melted in a melting medium, such as alkali metal or the like, and then CBN is precipitated under a static ultra-high pressure. In general, CBN is a powder formed from a single crystal, having a particle size of from 1 μm to several hundreds of μm and having a high strength and hardness, but also having has a cleavability. While, WBN is directly synthesized from gBN through phase conversion without the use of a melting medium by a method, wherein a pressure of about several hundreds Kb's generated by the explosion of an explosive is applied to the gBN, and polycrystal powders consisting of secondary particles having a particle size of from 0.1 μm to several tens of μm, are formed from aggregated primary particles having a size of several tens of nm, and have a high hardness and strength, and has no cleavability.

When a sintered body for a cutting tool is produced by containing CBN or WBN having the above described properties in the sintered body, the resulting sintered body exhibits the characteristic properties of the respective powders. In general, a sintered body containing CBN is sharp but results in a roughly cut surface due to the reason that the CBN particles have a shape having an acute angle. Further, the sintered body is apt to crack easily due to the cleavability of the CBN particles. While, a sintered body containing WBN is somewhat inferior in the sharpness to a sintered body containing CBN due to the irregular-shaped polycrystals of the WBN particles, the surface roughness of a material cut by the sintered body is lower than the surface roughness of a material cut by the sintered body containing CBN. Furthermore, the sintered body rarely cracks due to the absence of cleavability of the WBN particles.

In order to compensate the drawbacks of CBN and WBN, sintered bodies containing both CBN and WBN have been proposed in Japanese Patent Laid-Open Specification Nos. 77,359/81 and 97,448/80. Japanese Patent Laid-Open Specification No. 97,448/80 discloses a sintered body containing both WBN and CBN, which sintered body is produced from a starting material mixture of WBN, metal and ceramic by converting a part of the WBN into CBN during the sintering. While, Japanese Patent Laid-Open Specification No. 77,359/81 discloses a sintered body produced by sintering a starting material mixture of CBN, WBN, metal and ceramic, and consisting of 15–60% by volume of high density boron nitride and the remainder being cermet (metal and ceramic), which high density boron nitride consists of 4–16% by volume of CBN and 96–84% by volume of WBN.

Both of these inventions do not refer to the relation between the particle sizes of CBN and WBN.

The sintered bodies disclosed in these prior arts can be easily produced and are excellent in the cutting performance, wear resistance and workability, but are sometimes broken by chilled roll, ultra-heat resisting alloy, cast iron and the like, and are still insufficient in the cutting performance and wear resistance.

The inventors have made various investigations for developing a high density boron nitride-containing sintered body having a property adapted for cutting ultra-heat resisting alloy, cast iron and the like, and have discovered that when the high density boron nitride to be added to a starting material mixture for sintering is limited to two kinds of CBN and WBN, and further the ratio of the amount of CBN to that of WBN and the ratio of the average particle size of CBN to that of WBN are limited within certain ranges, a sintered body having excellent properties for cutting the above described materials can be obtained.

SUMMARY OF THE INVENTION

One of the features of the present invention lies in a high density boron nitride-containing sintered body for use as a cutting tool, consisting of 60–95% by volume of high density boron nitride and 40–5% by volume of metal alone or in admixture with a ceramic, said high density boron nitride consisting of 60–95% by volume of CBN and 40–5% by volume of WBN, and the CBN having an average particle size of at least 5 times that of the WBN.

Another feature of the present invention lies in a method of producing high density boron nitride-containing sintered bodies for use as a cutting tool, comprising mixing homogeneously 60–95% by volume of a high density boron nitride, which consists of 60–95% by volume of CBN and 40–5% by volume of WBN, and 40–5% by volume of metal alone or in admixture with a ceramic, and sintering the resulting mixture at a temperature of not lower than 1,000° C. under a pressure of 20–70 Kb, wherein the CBN has an average particle size of at least 5 times that of the WBN.

DESCRIPTION OF THE PREFERRED EMBODIMENT

It is necessary that a high density boron nitride-containing sintered body adapted for cutting a chilled roll and other material contains at least 60% by volume of high density boron nitride and has a micro-Vickers hardness of at least 3,000 kg/mm$^2$, preferably at least 3,300 kg/mm$^2$ (both values being measured at room temperature under a load of 1 kg).

Further, when two or more kinds of powdery high density boron nitrides having different average particle sizes are used in the production of a sintered body, the resulting sintered body has high hardness and wear resistance. In this case, when CBN is used as a powder having a larger average particle size and WBN is used as a powder having a smaller average particle size, and the ratio of the average particle size of the CBN to that of the WBN is limited to at least 5:1, the resulting sintered body has particularly high hardness and wear resistance.

The results are due to the following: In the case where powders having different particle sizes are loaded in into a capsule and sintered, and when the powders have controlled particle sizes different from each other, an optimum loading can be obtained, wherein fine powders are dispersed in the gaps formed between adjacent coarse powders. Furthermore, the loading density is increased, whereby the sintered state can be improved. Further, the dispersion of fine WBN powders into the gaps formed between adjacent coarse CBN powders reinforces the gaps formed between adjacent CBNs and prevents the breakage of CBN particles. Still further, when WBN is not dispersed in the gaps between adjacent CBNs, metal or metal and ceramic are dispersed into the gaps, and hence the wear resistance of the resulting sintered body is improved.

When only the particle size of high density boron nitrides to be mixed is to be adjusted, there are various possible combinations such as CBN coarse particles and CBN fine particles; WBN coarse particles and WBN fine particles; and WBN coarse particles and CBN fine particles in addition to the combination of CBN coarse particles and WBN fine particles. However, it has been found from experiment that the combination of CBN coarse particles and WBN fine particles results in the most desirable article. The reason is probably as follows. CBN coarse particles have a higher strength than WBN coarse particles, and WBN fine particles have a higher wear resistance than CBN fine particles. Accordingly, the above described combination of CBN coarse particles and WBN fine particles results in an excellent effect.

Moreover, it is difficult to obtain CBN fine particles and to obtain WBN coarse particles. Therefore, the above described combination of CBN coarse particles and WBN fine particles is advantageous for the production of the sintered body of the present invention.

Figure 1:
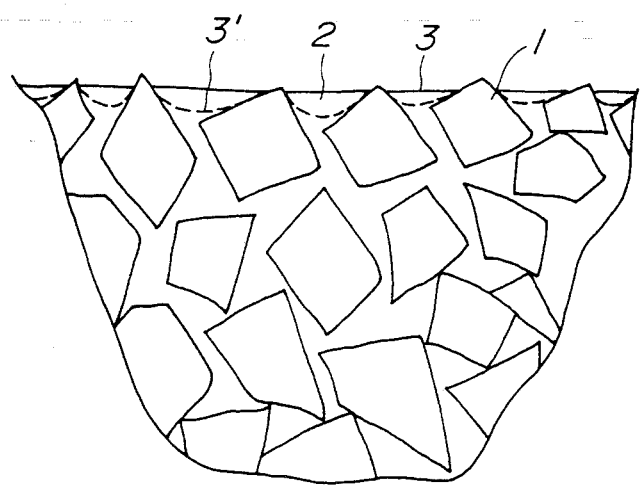
FIG. 1 is a view, in an enlarged scale, of the tip portion of a cutting tool made from a conventional sintered body consisting of CBN and metal alone or in admixture with a ceramic, for explaining the texture of the tip portion.

The effect of the combination of CBN coarse particles and WBN fine particles further results in a low surface roughness of the material to be cut. The reason is probably as follows. FIG. 1 is a view, in an enlarged scale, of the tip portion of a cutting tool made from a conventional sintered body consisting of CBN and metal alone or in admixture with a ceramic, to explain the texture of the tip portion. In FIG. 1, the numeral 1 represents a CBN particle; the numeral 2 represents a texture, which consists of metal or of metal and ceramic and fills gaps formed between CBN particles; and the numeral 3 represents the profile of the tip.

When a sintered body having the texture illustrated in FIG. 1 cuts a material, the portion of the texture 2, which consists of metal or of metal and ceramic, the metal and ceramic being softer than the CBN particle 1, and fills the gaps between the CBN particles, wears remarkably rapidly as compared with the CBN particle 1, and recedes to a profile 3', as shown in FIG. 1. Therefore, the profile of the tip changes from the substantially linear original shape into a shape having a large number of projections, and such shape having a large number of projections is transferred, during the cutting, to the surface of a material to be cut. Thus, the surface of the material to be cut is rough soon after the beginning of cutting.

Figure 2:
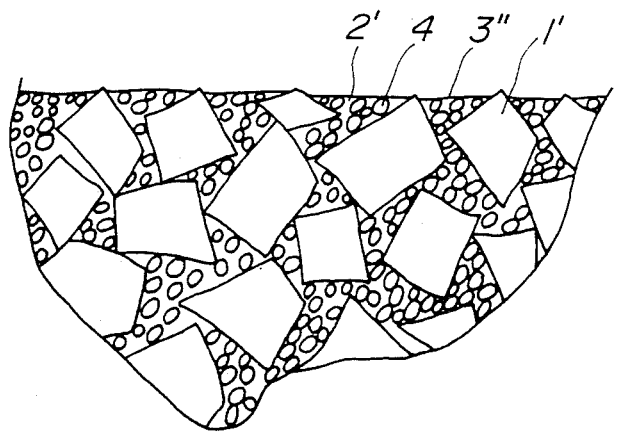
FIG. 2 is a view, in an enlarged scale, of the tip portion of a cutting tool made of the sintered body according to the present invention, for explaining the texture of the tip portion.

On the contrary, in the sintered body of the present invention, which contain WBN in addition to CBN, not only a texture 2' consisting of metal or of metal and ceramic, but also WBN particles 4 having substantially the same hardness as that of the CBN particles are filled into the gaps formed between the CBN particles, as illustrated in FIG. 2. Therefore, in the tip of a tool made from the sintered body of the present invention, the shape of a tip having a profile 3' having a large number of projections developed by the wear as shown in FIG. 1 does not appear. Thus the tip of the tool made from the sintered body of the present invention wears uniformly all over the tip while keeping substantially the original shape. Accordingly, it is probably possible to continue the cutting of a material to be cut, while maintaining a low surface roughness on the material.

Moreover, in the tip of the tool illustrated in FIG. 1, when the profile line of the tip goes back to the position of profile 3', CBN particles project from the tip, and therefore stress is concentrated to the projected CBN particles, and the CBN particles are apt to be easily worn, broken and exfoliated, resulting in an early scrapping of the tool. However, when a sintered body containing WBN is used, such troubles do not occur, and the durable life of the tool is prolonged.

In the production of a high density boron nitride-containing sintered body, only CBN and WBN may be used as starting materials and sintered. However, it is advantageous to sinter CBN and WBN together with metal or with metal and ceramic in order to produce sintered body under a mild sintering condition and to produce a sintered body having an excellent property as a cutting tool.

The reason why metal is added to the starting materials for a sintered body is as follows. CBN and WBN do not plastically flow even under a high pressure of several tens of thousands of atmospheres unless they are heated up to a high temperature of about 2,000° C. Therefore, metal which flows at a temperature lower than 2,000° C. flows into the gaps formed between CBN and WBN particles, and at the same time the metal is bonded with the surfaces of the CBN and WBN, whereby a strong sintered body is produced.

Further, the reason why metal and ceramic are added to starting materials of CBN and WBN is as follows. The strength of bonding phase formed by the metal is improved, whereby the strength of the sintered body is improved as a whole, and the wear resistance of the sintered body during cutting is improved.

The proper metal to be added to the starting materials of CBN and WBN, can be first group metals of nickel, cobalt, chromium, manganese and iron; second group metals of molybdenum, tungsten, vanadium, niobium, and tantalum; and third group metals of aluminum, magnesium, silicon, titanium, zirconium and hafnium. The first group metals have a high strength and further have a plastic fluidity, and hence the first group metals are suitable to be used for filling the gaps. The second group metals have a bonding action and further act to prevent the growth of bonding metal crystals to coarser crystals which make the sintered body weaker. The third group metals have a high affinity for CBN and WBN, and are effectively used for improving the wetting between CBN and metal or ceramic or between WBN and metal or ceramic and for producing a strong sintered body.

In the present invention, in addition to metal, ceramic can be added to the starting materials of CBN and WBN as described above. The ceramic to be added to the starting materials, can be oxides, carbides, nitrides and borides of the above described metals, and further boron carbide.

The type of metal or the types of combinations of metal and ceramic to be added to the starting CBN and WBN is determined depending upon the kind of a material to be cut by the resulting sintered body, upon the cutting method, or upon the sintering conditions. However, the kind of metal or the kind of the combination of metal and ceramic can be easily determined by those skilled in the art referring to the examples of the present invention.

In the present invention, a part of WBN to be contained in a sintered body may be converted into CBN in the case where the sintering pressure or temperature is high, or the sintering pressure or temperature is not so high but the metal or ceramic has an ability for converting WBN into CBN. However, even when such conversion occurs, the object of the present can be attained, wherein WBN fine particles fill the gaps formed between CBN coarse particles.

In the production of the sintered body according to the present invention, the apparatus for generating high pressure and high temperature. can be any apparatus capable of attaining the sintering condition of 20–70 Kb and a temperature of not lower than 1,000° C. defined in the present invention. In the following examples, a belt apparatus was used.

The following examples are given for the purpose of illustration of this invention and are not intended as limitations thereof.

EXAMPLE 1

A mixture of 90% by volume of CBN powders having an average particle size of 9 $\mu$m, 5% by volume of WBN powders having an average particle size of 1 $\mu$m, 3% by volume of aluminum powders having an average particle size of 10 $\mu$m and 2% by volume of nickel powders having an average particle size of 15 $\mu$m was homogeneously mixed for 4 hours in a ball mill made of cemented carbide. The homogeneously mixed powders were loaded in a stainless steel capsule having an outer diameter of 16 mm, a height of 9 mm and a thickness of 0.5 mm up to a height of 2 mm from the bottom. Then, to make a laminated structure of a BN containing body and sintered WC-Co body, mixed powders of 91% by weight of tungsten carbide and 9% by weight of cobalt were charged in a thickness of 6 mm in laminated form on the formerly charged BN mixed powders. The capsule was covered with a stainless steel cover having a diameter of 15 mm and a thickness of 0.5 mm, placed in an ultra-high pressure apparatus, and kept for 10 minutes under pressure and temperature conditions of 50 Kb and 1,200° C. to sinter the mixed powders.

The resulting sintered body has a micro-Vickers hardness of 3,800 kg/mm$^2$. Microscopical observation of the texture showed that WBN and metals were dispersed in the gaps formed between the CBN particles, and these elements were firmly sintered.

Then, the sintered body was ground into a disk having a diameter of 12.7 mm and a thickness of 4.76 mm by means of a diamond grinding wheel, and the disk was subjected to the following cutting test. A chilled steel having a diameter of 300 mm and a length of 2,000 mm was cut in a dry state under a condition of a depth of cut of 1.0 mm, a feed of 0.3 mm/rev and a peripheral speed of 45.2 m/min. After cutting for 1 hour in this test, the flank wear was 0.18 mm, and no crater wear was observed. The chilled steel used in the cutting test had a Rockwell hardness in C scale (HRC) of 65–67.

COMPARATIVE EXAMPLE 1

An experiment was effected in the exactly same manner as described in Example 1, except that whole of the high density boron nitride was replaced by the same CBN as used in Example 1. The resulting sintered body had a micro-Vickers hardness of 3,100 kg/mm$^2$. As the result of the cutting test, the sintered body was broken after cutting for 3 minutes, and a subsequent cutting test was not able to be effected.

EXAMPLE 2

A mixture of 60% of volume of CBN powders having an average particle size of 12 $\mu$m, 20% by volume of WBN powders having an average particle size of 2 $\mu$m, 3% by volume of aluminum powders having an average particle size of 10 $\mu$m, 4% by volume of magnesium powders having an average particle size of 18 $\mu$m, 2% by volume of cobalt powders having an average particle size of 20 $\mu$m and 11% by volume of titanium nitride powders having an average particle size of 2.3 $\mu$m was homogeneously mixed in the same manner as described in Example 1.

The homogeneously mixed powders were sintered in the same manner as described in Example 1. The resulting sintered body had a micro-Vickers hardness of 3,600 kg/mm$^2$. Microscopical observation of the texture disclosed that particles of alloys formed from aluminum, magnesium and cobalt, particles of titanium nitride, and particles of WBN were dispersed in the gaps between adjacent CBN particles, and a firmly bonded texture was formed. The titanium nitride used in this experiment contained nitrogen in a weight ratio of 0.68 based on the stoichiometric amount of nitrogen calculated as TiN.

The resulting sintered body was worked into the same shape as that described in Example 1, and was subjected to a cutting test with respect the same material to be cut as described in Example 1. When the material was cut in a dry state for 1.5 hours under a condition of a depth of cut of 1.8 mm, a feed of 0.8 mm/rev and a peripheral speed of 23 m/min, the flank wear was 0.3 mm and no crater wear was observed.

COMPARATIVE EXAMPLE 2

A sintered body similar to that in Example 2 was produced in the same manner as described in Example 2, except that 60% by volume of the CBN and 20% by volume of the WBN were wholly replaced by WBN having an average particle size of 1 $\mu$m.

The resulting sintered body had a micro-Vickers hardness of 2,400 kg/mm$^2$. When the sintered body was subjected to the same cutting test as described in Example 2, the flank wear reached 0.8 mm after cutting for 5 minutes, and a subsequent cutting was not able to be effected.

EXAMPLE 3

A mixture of 36% by volume of CBN having an average particle size of 6 $\mu$m, 24% by volume of WBN having an average particle size of 1 $\mu$m; 8% by volume of aluminum, 4% by volume of silicon and 0.5% by volume of manganese, each metal having an average particle size of not larger than 10 μm; 7.5% by volume of aluminum oxide having an average particle size of not larger than 3 μm, and 20% by volume of titanium boride having an average particle size of not larger than 3 μm was homogeneously mixed, and then sintered in the same manners as described in Example 1, except that the sintering pressure was 25 Kb and the sintering temperature was 1,300° C.

The resulting sintered body had a micro-Vickers hardness of 3,300 kg/mm$^2$. Microscopical observation of the texture showed that CBN particle was surrounded with ingredients other than the CBN.

The sintered body was crosswise cut into four sectors having a vertex angle of 90°. One of the sectors was silver-soldered to the end of a shank made of S45C steel, which had previously been hardened by heat treatment to HRC 53 and had a length of 150 mm and a square cross-section having a side of 25 mm length, to produce a bite for cutting test. A cutting test was effected by means of the bite. An SKH9 (JIS) steel, which corresponds to AIFI M2 and had been hardened by heat treatment to a hardness of HRC 63 and had a diameter of 100 mm and a length of 450 mm, was cut in a dry state under a condition of a depth of cut of 0.3 mm, a feed of 0.1 mm/rev and a peripheral speed of 78 m/min. After 16 minutes of the cutting test, the flank wear was 0.22 mm.

COMPARATIVE EXAMPLE 3

The experiment described in Example 3 was repeated, except that all of the high density boron nitride was replaced by the same CBN as used in Example 3.

The resulting sintered body had a micro-Vickers hardness of 3,100 kg/mm$^2$. Microscopical observation of the texture showed that CBN particle was surrounded with a texture formed of ingredients other than the CBN.

When the sintered body was subjected to the same cutting test as described in Example 3, the sintered body was broken after cutting for 1 minute, and a subsequent cutting was not able to be effected.

EXAMPLE 4

A mixture of 80% by volume of CBN powders having an average particle size of 9 μm, 10% by volume of WBN powders having an average particle size of 1 μm, 3% by volume of aluminum powders having an average particle size of 10 μm, 4% by volume of iron powders having an average particle size of 15 μm, 2.5% by volume of chromium powders having an average particle size of 20 μm, 0.5% by volume of molybdenum powders having an average particle size of 22 μm was homogeneously mixed, and sintered in the same manner as described in Example 1, except that the sintering pressure and temperature were 42 Kb and 1,450° C., respectively.

The resulting sintered body had a micro-Vickers hardness of 3,700 kg/mm$^2$. When the sintered body was subjected to the same cutting test as described in Example 1, the flank wear was 0.17 mm after cutting for 1 hour, and the crater wear was not observed.

COMPARATIVE EXAMPLE 4

A sintered body was produced and subjected to a cutting test in the same manner as described in Example 4, except that the WBN in the starting mixture was replaced by CBN having the same particle size as that of the WBN. The resulting sintered body had a micro-Vickers hardness of 3,600 kg/mm$^2$. After the cutting test for 1 hour, the flank wear was 0.55 mm, and the crater wear was observed.

EXAMPLE 5

A mixture of 60% by volume of CBN having an average particle size of 2 μm, 35% by volume of WBN having an average particle size of 0.3 μm, 2% by volume of titanium having an average particle size of 15 μm, 1.5% by volume of zirconium having an average particle size of 3 μm and 0.5% by volume of vanadium having an average particle size of not larger than 10 μm was homogeneously mixed, and sintered in the same manner as described in Example 1. The resulting sintered body had a micro-Vickers hardness of 3,900 kg/mm$^2$. When the sintered body was subjected to the same cutting test as described in Example 3, the flank wear was 0.18 mm after cutting for 16 minutes.

COMPARATIVE EXAMPLE 5

The experiment described in Example 5 was repeated, except that all of the high density boron nitride was replaced by WBN having an average particle size of 1 μm.

The resulting sintered body had a micro-Vickers hardness of 2,300 kg/mm$^2$. When the sintered body was subjected to the same cutting test as described in Example 3, the sintered body was broken after one minute.

EXAMPLE 6

A mixture of 50% by volume of CBN having an average particle size of 6 μm, 32% by volume of WBN having an average particle size of 0.5 μm; 8% by volume of tungsten carbide, 3% by volume of niobium carbide and 2% by volume of tantalum carbide, each carbide having an average particle size of not larger than 3 μm; and 3% by volume of hafnium and 2% by volume of cobalt, each metal having an average particle size of not larger than 10 μm, was homogeneously mixed, and sintered in the same manner as described in Example 1, except that the sintering pressure was 65 Kb and the sintering temperature was 1,580° C.

The resulting sintered body had a micro-Vickers hardness of 3,900 kg/mm$^2$. When the sintered body was subjected to the same cutting test as described in Example 1, the flank wear was 0.19 mm after cutting for 1 hour, and no crater wear was observed.

COMPARATIVE EXAMPLE 6

A sintered body was produced in the same manner as described in Example 6, except that all of the high density boron nitride used in Example 6 was replaced by CBN having an average particle size of 6 μm. The resulting sintered body had a micro-Vickers hardness of 3,700 kg/mm$^2$. When the sintered body was subjected to the same cutting test as described in Example 1, the surface roughness of the sintered body became extremely high after cutting for 30 minutes, and a subsequent cutting was not able to be effected. The flank wear reached 1 mm or more, and a large crater wear was observed.

EXAMPLE 7

The experiment described in Example 6 was repeated, except that the high density boron nitride used in Example 6 was replaced by 50% by volume of CBN having an average particle size of 15 μm, 20% by volume of WBN having an average particle size of 2 μm and 12% by volume of WBN having an average particle size of 0.3 μm.

The resulting sintered body had a micro-Vickers hardness of 4,100 kg/mm². When the sintered body was subjected to the same cutting test as described in Example 1, the flank wear was 0.16 mm after cutting for 1 hour, and no crater wear was observed.

COMPARATIVE EXAMPLE 7

The experiment described in Example 7 was repeated, except that all of the high density boron nitride used in Example 7 was replaced by CBN having an average particle size of 15 μm.

The resulting sintered body had a micro-Vickers hardness of 3,900 kg/mm². When the sintered body was subjected to the same cutting test as described in Example 1, the sintered body was broken after 40 minutes.

As thus, as described above and according to the present invention, two kinds of high density boron nitrides, that is, WBN and CBN, which have a specifically limited relation in the particle size, can be mixed together in a specifically limited mixing ratio together with metal alone or in admixture with a ceramic, whereby a sintered body can be produced more easily than the conventional method. Moreover, the resulting sintered body has a durability higher than that of any conventional sintered bodies, and can cut a material, which is difficult to cut, with a finish superior to that obtained by any conventional sintered bodies. Therefore, the present invention is very useful for industry.

What is claimed is:

1. A high density boron nitride-containing sintered body for use as a cutting tool, consisting essentially of 60-95% by volume of high density boron nitride and 40-5% by volume of metal alone or in admixture with a ceramic, said high density boron nitride consisting of 60-95% by volume of cubic boron nitride and 40-5% by volume of wurtzite-structured boron nitride, said cubic boron nitride having an average particle size of at least 5 times that of said wurtzite-structured boron nitride.

2. A method of producing high density boron nitride-containing sintered bodies for use as a cutting tool, comprising mixing together homogeneously 60-95% by volume of high density boron nitride, which consists of 60-95% by volume of cubic boron nitride and 40-5% by volume of wurtzite-structured boron nitride, with 40-5% by volume of metal alone or in admixture with a ceramic, and sintering the resulting mixture at temperature of not lower than 1,000° C. under a pressure of 20-70 Kb, wherein the cubic boron nitride has an average particle size of at least 5 times that of the wurtzite-structured boron nitride.

* * * * *